(12) United States Patent
Stokkelien et al.

(10) Patent No.: US 12,245,908 B2
(45) Date of Patent: Mar. 11, 2025

(54) DEVICE FOR DISTRIBUTION OF A LIQUID IN A USER'S MOUTH

(71) Applicant: ALIVA AS, Kristiansand (NO)

(72) Inventors: Anders Stokkelien, Kristiansand (NO); Preben Falkum, Kristiansand (NO); Cato Stene Kolstad, Kristiansand (NO)

(73) Assignee: ALIVA AS, Kristiansand (NO)

( * ) Notice: Subject to any disclaimer, the term of this patent is extended or adjusted under 35 U.S.C. 154(b) by 0 days.

(21) Appl. No.: 17/642,720

(22) PCT Filed: Sep. 11, 2020

(86) PCT No.: PCT/EP2020/075546
§ 371 (c)(1),
(2) Date: Mar. 14, 2022

(87) PCT Pub. No.: WO2021/048406
PCT Pub. Date: Mar. 18, 2021

(65) Prior Publication Data
US 2022/0323191 A1   Oct. 13, 2022

(30) Foreign Application Priority Data

Sep. 13, 2019   (NO) .................................. 20191106

(51) Int. Cl.
*A61C 17/024*   (2006.01)
*A61C 19/06*   (2006.01)
(52) U.S. Cl.
CPC .......... *A61C 19/063* (2013.01); *A61C 17/024* (2019.05)

(58) Field of Classification Search
CPC ............... A61C 19/063; A61C 17/024; A61M 2210/0625; A61M 16/0488; A61M 15/0021; A61M 2210/0631
See application file for complete search history.

(56) References Cited

U.S. PATENT DOCUMENTS

| 4,292,978 | A | * | 10/1981 | Guth .................. G01N 33/4972 55/440 |
| 5,055,108 | A | | 10/1991 | Jenkins |
| 8,684,956 | B2 | | 4/2014 | McDonough et al. |
| 9,636,195 | B2 | | 5/2017 | Wolpo |

(Continued)

FOREIGN PATENT DOCUMENTS

| AU | 2015200296 B2 * | 1/2017 | ............. A61H 13/00 |
| CN | 2624852 Y | 7/2004 | |

(Continued)

OTHER PUBLICATIONS https://www.aarc.org/wp-content/uploads/2015/04/aerosol_guide_rt.pdf (Year: 2020).*

(Continued)

*Primary Examiner* — Cris L. Rodriguez
*Assistant Examiner* — Luis Ruiz Martin
(74) *Attorney, Agent, or Firm* — Withrow + Terranova, PLLC; Vincent K. Gustafson

(57) ABSTRACT

A mouthpiece for distribution of a liquid in a user's mouth, the mouthpiece comprising an inlet for a tube and an internal channel with at least two outlets, wherein the mouthpiece is configured to be positioned within a superior vestibule of the user's mouth apical to a gingival margin, wherein a thickness of the mouthpiece is less than 1 mm.

19 Claims, 6 Drawing Sheets

(56) References Cited

U.S. PATENT DOCUMENTS

| | | | |
|---|---|---|---|
| 2005/0260544 A1* | 11/2005 | Jones | A61K 8/042 |
| | | | 424/49 |
| 2007/0204867 A1 | 9/2007 | Kennedy, Jr. et al. | |
| 2008/0171303 A1 | 7/2008 | Roberts et al. | |
| 2008/0255498 A1 | 10/2008 | Houle | |
| 2011/0270166 A1* | 11/2011 | Martin | A61H 21/00 |
| | | | 604/79 |
| 2013/0025607 A1 | 1/2013 | Altounian | |
| 2015/0328084 A1* | 11/2015 | Cash | A61J 7/0092 |
| | | | 604/79 |
| 2016/0361149 A1* | 12/2016 | Otsuka | A61C 17/0217 |
| 2018/0263746 A1 | 9/2018 | Demarest et al. | |
| 2019/0008726 A1* | 1/2019 | Altounian | A61M 31/00 |

FOREIGN PATENT DOCUMENTS

| | | | | |
|---|---|---|---|---|
| EP | 2700396 A2 * | 2/2014 | | A61C 19/063 |
| JP | S527994 U | 1/1977 | | |
| JP | 2015229085 A | 12/2015 | | |
| JP | 2017529134 A | 10/2017 | | |
| JP | 2020503149 A | 1/2020 | | |
| WO | 2009127947 A2 | 10/2009 | | |
| WO | WO-2013014172 A2 * | 1/2013 | | A61C 17/0211 |
| WO | 2013014172 A1 | 9/2018 | | |

OTHER PUBLICATIONS

International Search Report and Written Opinion for International Patent Application No. PCT/EP2020/075546, mailed Dec. 16, 2020, 17 pages.
Search Report for Norwegian Patent Application No. 20191106, dated Jul. 1, 2021, 2 pages.
Search Report for Norwegian Patent Application No. 20191106, dated Apr. 3, 2020, 2 pages.
Decision to Grant a Patent for Japanese Patent Application No. 2022-516370, dated May 21, 2024, 3 pages.

* cited by examiner

DEVICE FOR DISTRIBUTION OF A LIQUID IN A USER'S MOUTH

This application is a 35 U.S.C. § 371 national phase filing of International Application No. PCT/EP2020/075546, filed on Sep. 11, 2020, and claims the benefit of Norwegian patent application No. 20191106 filed on Sep. 13, 2019, wherein the entire contents of the foregoing applications are hereby incorporated by reference herein.

The invention relates to a mouthpiece for distribution of a liquid in a user's mouth, the mouthpiece comprising an inlet for a tube and an internal channel with at least two outlets, wherein the mouthpiece is configured to be positioned within a superior vestibule of the user's mouth apical to a gingival margin.

Xerostomia is a dry mouth symptom, possible due to insufficient production of saliva. As saliva has a plurality of functions in the mouth, xerostomia may lead to many connected symptoms, for example dental caries, acid erosion of the teeth, difficulties with swallowing food, etc.

Xerostomia can have different causes, and treatment of the underlying cause is often difficult. Thus, treatment is mostly concerned with alleviating the symptom rather than curing the cause. Treatment may for example include saliva stimulants such as chewing gum or pastels, or saliva substitutes.

Devices to deliver fluids orally in a continuous manner, or when desired by the patient, have been invented. Such devices have the advantage of mimicking the production of saliva for the salivary glands. For example, US2007/0204867 A1 discloses systems and methods for delivering liquid orally to the mouth, the system comprising a liquid container, an oral device, and a tube connecting the two. U.S. Pat. No. 5,055,108 discloses a liquid filled soft pouch attached to the hard palate, wherein the user may release the liquid with movement of the tongue. US2008/0171303 A1 discloses an oral rehydration device comprising a tube inserted into the user's mouth and held in place via an earpiece.

However, the prior art embodiments experience different drawbacks. For example, the oral devices may be required to be attached to the teeth, whereby they are not suitable for use while chewing/eating. This may be a major disadvantage as the saliva functions to moisten the food in the mouth, thereby making it easier to swallow. Additionally, some embodiments may not release the liquid at optimal regions of the mouth, they may be insufficiently fixated in the mouth, or they may have a low degree of compliance and comfortability for the user.

The invention has for its object to remedy or to reduce at least one of the drawbacks of the prior art, or at least provide a useful alternative to prior art. The object is achieved through features which are specified in the description below and in the claims that follow. The invention is defined by the independent patent claims, while the dependent claims define advantageous embodiments of the invention.

In a first aspect, the invention relates to a mouthpiece for distribution of a liquid in a user's mouth, the mouthpiece comprising an inlet for a tube and an internal channel with at least two outlets, wherein the mouthpiece is configured to be positioned within a superior vestibule of the user's mouth apical to a gingival margin, wherein a thickness of the mouthpiece is less than 1.0 mm. When the entire mouthpiece is positioned apical to the gingival margin, the mouthpiece will be positioned outside of the oral cavity proper and will not be in contact with the teeth. This position of the mouthpiece may make eating with the mouthpiece in place easier, since neither the teeth nor the oral cavity proper is affected. This may be a major advantage, as people suffering from xerostomia may have trouble swallowing dry food due to the lack of naturally moistening saliva.

The mouthpiece may be adapted to be positioned at the highest point within the superior vestibule of the user's mouth e.g. the mouthpiece may be sized and shaped to be worn between the user's superior (upper) lip and superior gingivae (upper gums), and may be configured to be worn higher than the user's teeth (i.e. above the gingival margin) so as not to obstruct the teeth. In other words, the mouthpiece may be configured to be positioned within the superior vestibule spaced apart from or distal to the gingival margin and/or the teeth. The entire mouthpiece may be adapted to be positioned at the highest point within the superior vestibule of the user's mouth. By positioning the mouthpiece in the uppermost part of the superior vestibule, the mouthpiece may be worn for long periods of time without interfering with normal mouth operations. This makes it suitable for wearing during such normal mouth operations, e.g. eating and talking, unlike mouthpieces of the prior art.

The mouthpiece may be anatomically complementary to the superior vestibule to be firmly positioned within said superior vestibule. The shape of the mouthpiece may thus be bent, for example like a C or a U. The mouthpiece may be curved along its length e.g. so that when worn it wraps around the outside of the user's upper gums from one side of the mouth to the other. The mouthpiece may be flexible so that it will be adjusted to fit the user's mouth, whereby a standard shape may fit a range of users. This has the advantage that only a few different standard sizes are required to fit all users, which may reduce the production costs of the mouthpiece. The mouthpiece may for example comprise a silicone material, such as e.g. polyvinyl siloxane, or another material which is recognized as safe to keep in the mouth for long periods of time and has a good compliance for the patient.

An effect of the mouthpiece being thin is that it is more comfortable to use than prior art embodiments. Since the mouthpiece is typically worn by the user for many hours a day, comfortability is an important aspect. A thin mouthpiece may be very flexible, whereby it may be able to follow the contour of the mucous membrane of the mouth. In this way the mouthpiece may be considered to be organically shaped.

As mentioned above, the mouthpiece has a thickness of less than 1.0 mm. Therefore, the majority of the mouthpiece is less than 1.0 mm thick. The mouthpiece may have a thickness of equal to or less than 0.8 mm, or even equal to or less than 0.6 mm. It may have a thickness of less than or equal to 0.75 mm. It may have a thickness in the range of 0.5 to less than 1.0 mm, or 0.5 to 0.9 mm. It will be well appreciated that where the terms "thick" and "thin" and "thickness" are used here, they are referring to the depth of the mouthpiece, i.e. from front to back when the mouthpiece is being worn.

The mouthpiece may typically be significantly wider than it is thick, for example around 1.0 cm wide, around 0.8 cm wide, or around 0.6 cm wide. The mouthpiece may be 1.5 cm wide or less, for example 1.3 cm. It may have a width in the range of 0.6 cm to 1.5 cm, or 0.8 cm to 1.5 cm, or 1.0 cm to 1.5 cm. It is possible for the mouthpiece to have such widths since it is configured to be positioned within a superior vestibule of the user's mouth apical to a gingival margin, and will therefore not impact the teeth. The mouthpiece will thereby have a large surface to volume ratio so that it may better adhere to the mucous membrane of the user. This will ensure that the mouthpiece will stay in the correct position once placed in the mouth. Additionally, when the mouthpiece is wide, the internal channel in the mouthpiece may be wider than if the mouthpiece were a thin tube. In this way the channel may hold a larger volume of liquid. This may have the effect that the pressure in the channel is more even, whereby the distribution of the liquid will be more even in the at least two outlets. It also enables a sufficient rate of fluid supply which may not be achieved if the channel were narrower. Consequently, by providing a thin mouthpiece, e.g. with a thickness <1.0 mm, which is configured to be positioned within a superior vestibule of the user's mouth apical to a gingival margin, the width of the mouthpiece and hence the channel can be made large enough to provide a sufficient fluid supply, whilst minimising the effect of the mouthpiece on chewing, talking etc. It will be well appreciated that where the terms "wide" and "width" are used here, they are referring to the dimension from the top to the bottom of the mouthpiece, i.e. the dimension substantially perpendicular to the thickness.

The larger internal channel by virtue of the wide mouthpiece provides a larger volume of liquid held in the mouthpiece during use than if the mouthpiece were narrower, and hence may act as a reservoir of liquid in the mouthpiece, allowing improved liquid distribution to the user's mouth because a source is readily available. Moreover, because the mouthpiece is flexible, when a user moves their mouth e.g. chewing food, that movement may help dispense or distribute liquid from the internal channel. Chewing may therefore help to pump liquid into the user's mouth, and the mouthpiece may therefore automatically provide increased liquid distribution when it is needed e.g. during chewing and eating.

The internal channel may for example have a width in the range of 1 mm to 3 mm, such as 2 mm. It may have a thickness less than the complete thickness of the mouthpiece, due to the wall on either side. The channel may be 2, 4, 6, 8, 10, 12, 14 or 16 times wider than it is thick. The dimensions of the channel may increase when filled with fluid, due to stretching of the material.

The internal channel of the mouthpiece may be a single internal channel, configured to fluidly connect the inlet of the mouthpiece to at least two outlets. The single channel may fluidly connect the two outlets e.g. fluidly connecting a first outlet on a first side of the mouthpiece (e.g. the right side) with a second outlet on a second, opposite side of the mouthpiece (e.g. the left side). The mouthpiece may comprise only a single internal channel. At least one outlet may be provided in either side of the mouthpiece e.g. one on the left and one on the right of the user's mouth. The single channel may therefore provide liquid to both sides (left and right) of the mouth, specifically the left and right sides of the superior vestibule. The distribution of the liquid to the outlets may thus be determined by the pressure in the internal channel. The single channel may therefore help to self-regulate the distribution of the liquid to ensure it is even, as well as to reduce the likelihood of the mouthpiece failing or breaking e.g. in the event that one of the outlets becomes blocked, for example by food.

The mouthpiece may comprise a contact area to be attached to the gum of the user. The contact area may be defined by the length and the width of the mouthpiece. The length of the mouthpiece may be selected to correspond to the mouth dimensions of the particular user for a comfortable fit.

For example, the length of the mouthpiece may be equivalent to a measured distance along the superior vestibule from the back of the left side to the back of the right side. As previously discussed, the mouthpiece may be wide (width' being measured e.g. in a direction parallel to the surface of the superior gingiva) in order to provide a large contact area for attachment to the mucous membrane of the superior gingiva (gum) of the user. This may improve the attachment of the mouthpiece. In addition, increasing the width of the mouthpiece may ensure that the single internal channel has a large cross-section, even if it is constructed to be thin (thickness' being measured e.g. in a direction perpendicular to the surface of the superior gingiva).

As a direct result of the geometry of the mouthpiece, the internal channel may have an elongate cross-section (and may be e.g. shaped substantially as a rectangle, ellipse, stadium, oval etc.) with a large width relative to the thickness. As mentioned above, for example, the width of cross-section of the internal channel may be 2, 4, 6, 8, 10, 12, 14 or 16 times greater than its thickness. This configuration of the mouthpiece thus may provide improved comfort, while maintaining a desired rate of fluid delivery. A major disadvantage of mouthpieces of the prior art is that they cannot be made thin without significantly reducing the cross-sectional area of fluid delivery channels.

The mouthpiece may sufficiently attach to the mucous membrane without the need for any additional substance. E.g. saliva will be present between the mouthpiece and the membrane, and this may adequately retain the mouthpiece in place, e.g. by cohesion/adhesion. In other words, the mouthpiece may be affixed to the mucous membrane by the presence of moisture in the mouth, without requiring any further substance. Such attachment may be improved by the shape of the mouthpiece, e.g. by having a large surface to volume ratio as mentioned above.

However, to further improve the attachment of the mouthpiece to the mucous membrane, the surface of the mouthpiece may comprise an adhesive layer. The material of the adhesive layer must be safe for humans to consume. The adhesive layer may be a dry material that obtains adhesive properties only after being wetted. This will have the advantage that the mouthpiece will not stick to other surfaces before it is to be used. Wetting of the mouthpiece may easily be performed, for example by applying water on the mouthpiece with a finger prior to use. A suitable adhesive material may for example be or be based on gum arabic, which is efficient, and established to be safe for humans. Gum arabic may also be applied on the mouthpiece as a powder. The adhesive material may also be e.g. starch. The surface of the mouthpiece may be rough, for example comprising small grooves, for the adhesive material to stick better to said surface.

As discussed above, the mouthpiece may typically be worn by the user for many hours a day. The material of the adhesive layer may therefore be selected to exhibit strong bonding properties for an extended time period, for example all day, or between 2-10 hours, preferably between 6-10 hours. By firmly securing the mouthpiece in the mouth for extended time periods, the comfort of the mouthpiece during use may be greatly increased.

The mouthpiece may be constructed such that, when in use, each outlet is positioned complementary to an opening of a parotid duct. The parotid ducts are where the saliva produced by the parotid glands enters the mouth, so these positions of the outlets are therefore the most natural regions of the mouth to inject liquid such as water or saliva substitutes.

The mouthpiece may additionally comprise two flaps adapted to fit within the cavities of the superior vestibule which are present on each side of a labial frenulum, and a slit wherein the labial frenulum may fit. This will further improve the fit of the mouthpiece to the user's mouth such that the mouthpiece does not slip out of position.

The slit may be adapted to receive the labial frenulum when the mouthpiece is positioned in the superior vestibule. As a direct result of this feature, the mouthpiece may be positioned at the highest point within the superior vestibule of the user's mouth, without being displaced downwardly by the labial frenulum. By adapting the mouthpiece to fit at the highest point in the superior vestibule, the mouthpiece (and internal channel) can be made wider without touching the teeth and without interfering with chewing or eating. As discussed, increasing the width of the mouthpiece, and decreasing the thickness, may provide a more comfortable mouthpiece while maintaining the desired cross-sectional area and the desired liquid flow rate. The slit and flaps may also be arranged to correctly position the mouthpiece e.g. with outlets adjacent the openings of the parotid ducts. The slit may be located at the front and top of the mouthpiece when it is worn by the user. The flaps may be located either side of the slit.

The slit may extend into the mouthpiece by up to 3 mm. For example, it may extend into the mouthpiece by a distance in the range of 0.5 to 2 mm. In one embodiment, the slit may extend into the mouthpiece by 1 mm.

An assembly may be provided in which the mouthpiece is connected to an injection tube whereby water, saliva substitutes, pharmaceutical etc. may easily be administered to and distributed within the user's mouth. The injection tube may be configured to extend out of the user's mouth. It may be attachable to and detachable from a check valve. The injection tube may include a check valve. The injection tube may be any suitable length. The injection tube may be from 1 m to 3 m long, for example 2 m long. Alternatively, the injection tube may be between about 10 cm and 70 cm, between about 30 cm and 50 cm, and may be about 40 cm. The injection tube may be reversibly or irreversibly connected to the inlet of the mouthpiece. However, preferably, the injection tube is irreversibly connected, i.e. permanently fixed, to the inlet of the mouthpiece. The injection tube may have an outer diameter of between 1.0 mm and 3.0 mm, and may have an outer diameter of about 2.0 mm.

The mouthpiece may be provided as a single-use, i.e. disposable, item. The assembly comprising the mouthpiece and the injection tube, optionally including the check valve, may be provided as a single-use, i.e. disposable, item. Typically, the mouthpiece or assembly may be suitable for use for up to 24 hours. At the end of that time, it would generally be disposed of and replaced with a new mouthpiece or assembly. This will have the benefit that it will not be necessary to clean the mouthpiece to keep a good hygiene. The simple and thin design of the mouthpiece will make it cost-effective to manufacture, whereby single use is feasible for the user. Since the assembly may be disposable, it may not include a check valve and may therefore be sufficiently simple and cost-effective to manufacture.

In a preferred embodiment, the inlet of the mouthpiece may be irreversibly connected to an injection tube configured to extend out of the user's mouth, whereby water, saliva substitutes, pharmaceutical etc. may easily be administered to and distributed within the user's mouth. For example, the mouthpiece and the injection tube may be molded together.

The opposite end of the injection tube may be configured to be easily attachable to and detachable from a check valve. The check valve may be attached via a second tube to a reservoir containing the liquid to be injected. The second tube may be from 0.2 m to 0.5 m long, such as 0.4 m long. A pump may provide the force to inject the liquid. The check valve will thus inhibit liquid from the mouthpiece to run back into the second tube and the reservoir. In this way the mouthpiece may be suitable for single use, such that a new mouthpiece may be used e.g. once a day. This will have the benefit that it will not be necessary to clean the mouthpiece to keep a good hygiene. The simple and thin design of the mouthpiece will make it cost-effective to manufacture, whereby single use is feasible for the user.

In a preferred embodiment, only a single injection tube is connected to the inlet. Utilising only a single injection tube to supply fluid to the mouthpiece is highly advantageous over prior art devices using multiple tubes, since this is less cumbersome and bulky for the user both inside and outside the mouth, is more comfortable, and minimises interference with chewing and talking etc.

The opposite end of the injection tube (i.e. the end opposite to that connected to the inlet of the mouthpiece) may be configured to be easily attachable to and detachable from a container for containing the liquid to be distributed to the user's mouth.

Equally, the opposite end of the injection tube may be configured to be easily attachable to and detachable from other components of a liquid distribution system (e.g. a pump, a check valve as mentioned above, additional tubing) which are in fluid communication with the container. The injection tube may therefore comprise a connection device for forming a connection to a fluid supply. For example, the connection device may be operable to connect the injection tube to a check valve to receive liquid therefrom. In another embodiment, the opposite end of the injection tube is directly connected to a second tube which is in fluid communication with the reservoir. The injection tube may comprise a connection device for connecting the injection tube to a second tube. A connection device or plug may connect the injection tube to a second tube. A one way valve may connect the injection tube to a second tube. The second tube may be in fluid communication with the reservoir via a pump, i.e. the pump pumps fluid from the reservoir through the second tube, the injection tube, and thereby into the inlet of the mouthpiece.

The second tube may have an outer diameter of between 1.0 mm and 3.0 mm, and may have an outer diameter of about 2.0 mm. The second tube may be any suitable length. For example, it may be between about 10 cm and 70 cm, between about 30 cm and 50 cm, and may be about 40 cm. The second tube may be shorter than the injection tube.

The injection tube may comprise silicon.

The inlet of the mouthpiece may be positioned in the front, close to the mouth opening. This ensures even distribution of fluid to the at least two openings in the left and right side of the mouth. Alternatively, the inlet may be positioned at the side of the mouth (e.g. off-centre), so as not to interfere with the insertion of food, for example, into the mouth. This may make eating with the mouthpiece in place easier.

As will be appreciated from the above discussion, the injection tube may generally terminate at the inlet of the mouthpiece. Thereafter, the fluid flows through the channel in the mouthpiece. Consequently, the impact of the injection tube on comfort, eating, talking etc. is minimised, since it does not extend around the teeth towards the back of the mouth.

The mouthpiece may be used to alleviate xerostomia by being inserted into the mouth of a person suffering from xerostomia and injecting a liquid through said mouthpiece via the inlet. The liquid may for example comprise water, saliva substitutes, or aqueous solutions comprising pharmaceuticals etc. The saliva substitutes may be e.g. synthetic saliva, and the pharmaceuticals may be e.g. saliva stimulants.

The mouthpiece may be used to alleviate xerostomia by delivering fluids orally at a continuous rate to simulate a healthy production of saliva. In a healthy person, the normal daily production of saliva varies between 0.5-1.5 litres. An unstimulated saliva flow rate is approximately 0.3-0.4 ml/min. This rate decreases to approximately 0.1 ml/min during sleep and increases to about 4.0-5.0 ml/min during eating, chewing and other stimulating activities. Accordingly, the mouthpiece may be configured to provide fluid, such as water or saliva substitutes, at a rate of between 0.0-1.0 ml/min to imitate a healthy saliva flow. As discussed earlier, this flow may be delivered to an opening of a parotid duct in order to even more accurately reproduce the healthy biological production of saliva.

In a second aspect the invention relates to a liquid distribution system comprising the mouthpiece according to the first aspect of the invention, wherein the liquid distribution system additionally comprises a container for containing the liquid to be distributed to the user's mouth, a further tube for liquid communication from the container to the mouthpiece, and a mechanism for conducting flow of the liquid from the container to the mouthpiece. This mechanism may for example utilise a mechanical pump or an expanding gas which pushes the liquid out of the container and into through the further tube.

The mechanical pump may be configured to continuously provide fluid in order to simulate a healthy flow of saliva. For example, the pump may be configured to provide fluid at a constant rate between 0.0-2.0 ml/min, or 0.0-1.0 ml/min. Alternatively, the pump may be precisely controlled by the user to provide fluid as desired. The pump may be configured to remember a previous setting. Therefore, in the event that a power supply to the pump is terminated, inadvertently or otherwise, upon being reconnected to power the pump can resume its previous operation. The pump may be configured to continuously deliver liquid (e.g. at a constant rate) for more than 2, 4, 6, 8 or 10 hours.

The mechanism for conducting flow of the liquid from the container to the mouthpiece may comprise a hand pump, such as a rubber bulb pump.

The liquid distribution system may be configured to identify when the container needs to be replaced. The container may include a RFID tag for identification of the container. The pump may be configured to read the RFID tag, and receive data from the RFID tag relating to the container, such as the initial volume of liquid within the container. The pump may be able to accurately determine the water volume that has been delivered by the pump to the mouthpiece. To that effect, the pump may comprise a step motor and a Hall-effect sensor. Furthermore, the pump may comprise a means for alerting a user that the volume of liquid remaining in the container is low, such as an alarm or LED.

The container may be configured for containing a liquid comprising dissolved carbon dioxide, so that the carbon dioxide stays dissolved while the liquid is inside the container. The container should therefore be sufficiently strong to not expand, and sufficiently air tight to not allow carbon dioxide gas to escape. Carbon dioxide may for example be introduced to the liquid under high pressure. Carbon dioxide in the liquid will cause bubbles to form when the pressure is decreased, for example when the liquid is led from the container to the mouthpiece. The bubbles may function to keep the internal channel and/or the outlets of the mouthpiece clean and may cause the liquid to resemble saliva more, since saliva typically contains bubbles. Carbon dioxide additionally has the benefit that it may make the liquid slightly acidic, which may trigger the production of saliva from the parotid glands.

The further tube for liquid communication from the container to the mouthpiece may comprise an injection tube. The liquid distribution system may include a check valve connected to (or for connection to) the injection tube. In this embodiment, the liquid distribution system may also include a second tube connecting the check valve to the liquid container. The check valve may inhibit liquid from the mouthpiece flowing back into the second tube and/or the reservoir. In another embodiment, the liquid distribution system does not include a check valve, but instead comprises a connection device, plug, or one-way valve that connects the injection tube to a second tube. The second tube may be in fluid communication with the container such that liquid may flow from the container, through the second tube and injection tube, and into the inlet of the mouthpiece.

The mouthpiece may comprise a structural element, such as a rib or the like. The structural element may be arranged to provide structural support for the mouthpiece, and may make insertion of the mouthpiece into a user's mouth easier e.g. by carrying otherwise flexible portions of the mouthpiece to the back of the user's mouth, thereby making correct positioning of the mouthpiece easier. The structural element may be hard or stiff, and may extend from one side of the mouthpiece to the other so that in use it extends from one side of the user's mouth to the other e.g. from the left side of the mouth to the right side of the mouth. The structural element may be formed of any suitable material. For example, it may be formed of polyethylene terephthalate (PET). The structural element may be disposed between constituent layers (e.g. silicone sheets) of the mouthpiece to thereby maintain the shape the mouthpiece for wearing by a user. The structural element may not be thicker than 0.25 mm, or may not be thicker than 0.20 mm, or may not be thicker than 0.15 mm.

A method for manufacturing the mouthpiece may for example comprise the steps of: providing a first half of the mouthpiece as a sheet in a suitable material; providing a second half of the mouthpiece as a sheet in a suitable material, wherein the second half has at least two holes; and fixing the two sheets together while keeping a region between the at least two holes unfixed to create the internal channel. This is an effective way to create a thin mouthpiece. If the mouthpiece is made of silicone, fixing the two halves together may for example be done using a platinum cross-linking agent followed by vulcanization.

According to another aspect of the invention there is provided a mouthpiece for distribution of a liquid in a user's mouth, the mouthpiece comprising an inlet for a tube and an internal channel with at least two outlets, wherein the mouthpiece is configured to be worn by the user between the user's superior lip and superior gingivae. The mouthpiece may be configured to be worn spaced apart from (e.g. above) the user's superior gingival margin. The mouthpiece may comprise any of the features described herein with reference to other aspects of the invention.

In yet another aspect of the invention, there is provided a mouthpiece for distribution of a liquid in a user's mouth, the mouthpiece comprising an inlet for a tube and an internal channel with at least two outlets, wherein the mouthpiece is configured to be positioned within a superior vestibule of the user's mouth. The mouthpiece may be configured to be worn above the user's superior gingival margin, in other words, apical to the gingival margin. The mouthpiece may comprise any of the features described herein with reference to other aspects of the invention.

In a still further aspect, the invention provides a method of distributing liquid in a user's mouth, comprising placing a mouthpiece within a superior vestibule of the user's mouth apical to a gingival margin, wherein the mouthpiece comprises an internal channel with at least two outlets and has a thickness less than 1.0 mm, the method further comprising: supplying liquid from a container through at least one tube and into an inlet in the internal channel of the mouthpiece.

In the following is described examples of preferred embodiments illustrated in the accompanying drawings, wherein.

Figure 1:
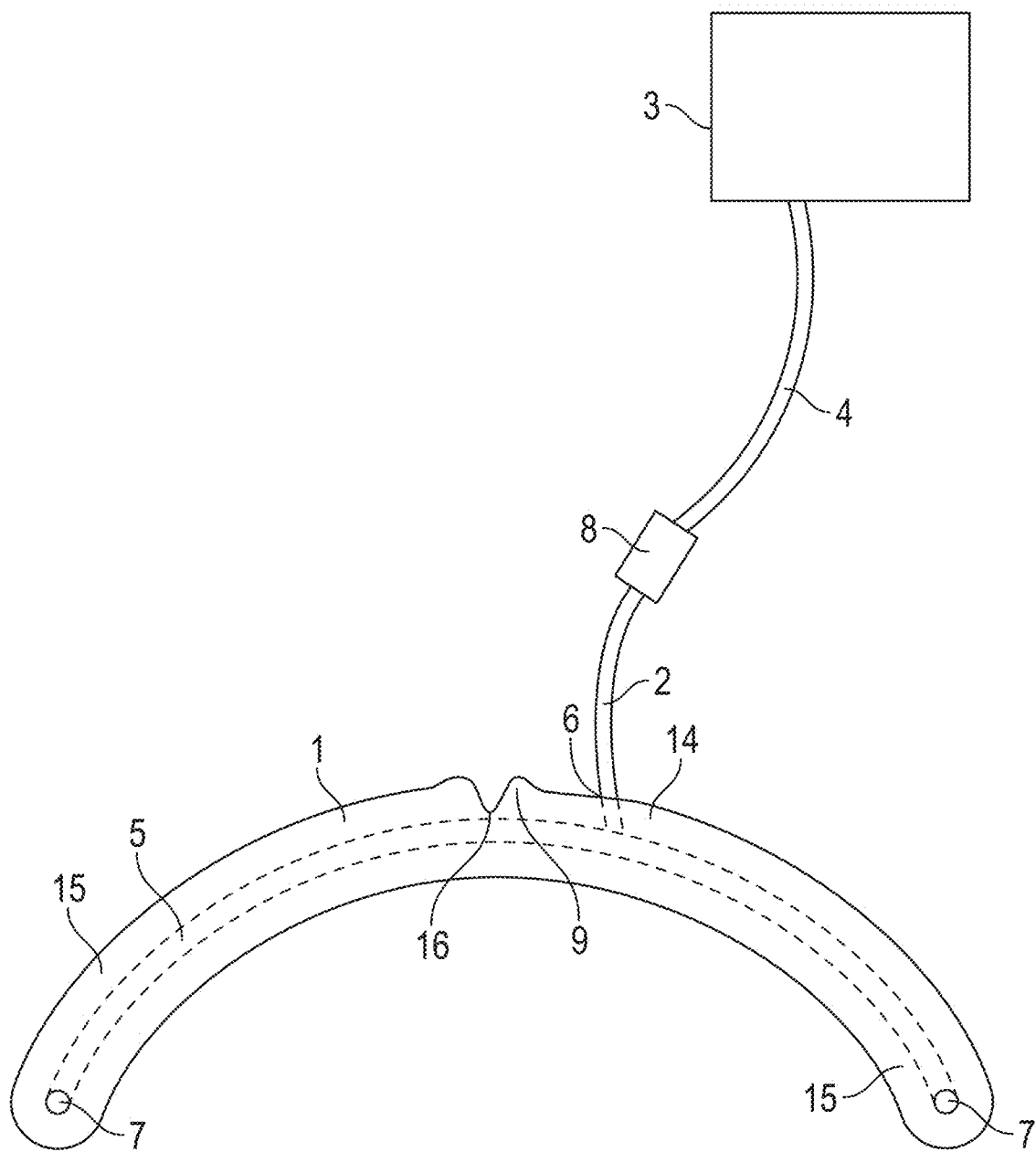
FIG. 1 shows schematically a mouthpiece according to an embodiment of the invention, an injection tube, and a liquid reservoir.

In the drawings, the reference numeral 1 indicates a mouthpiece according to the invention. Identical reference numerals indicate identical or similar features. The drawings are presented in a simplified and schematic manner, and the features therein are not necessarily drawn to scale.

Figure 2:
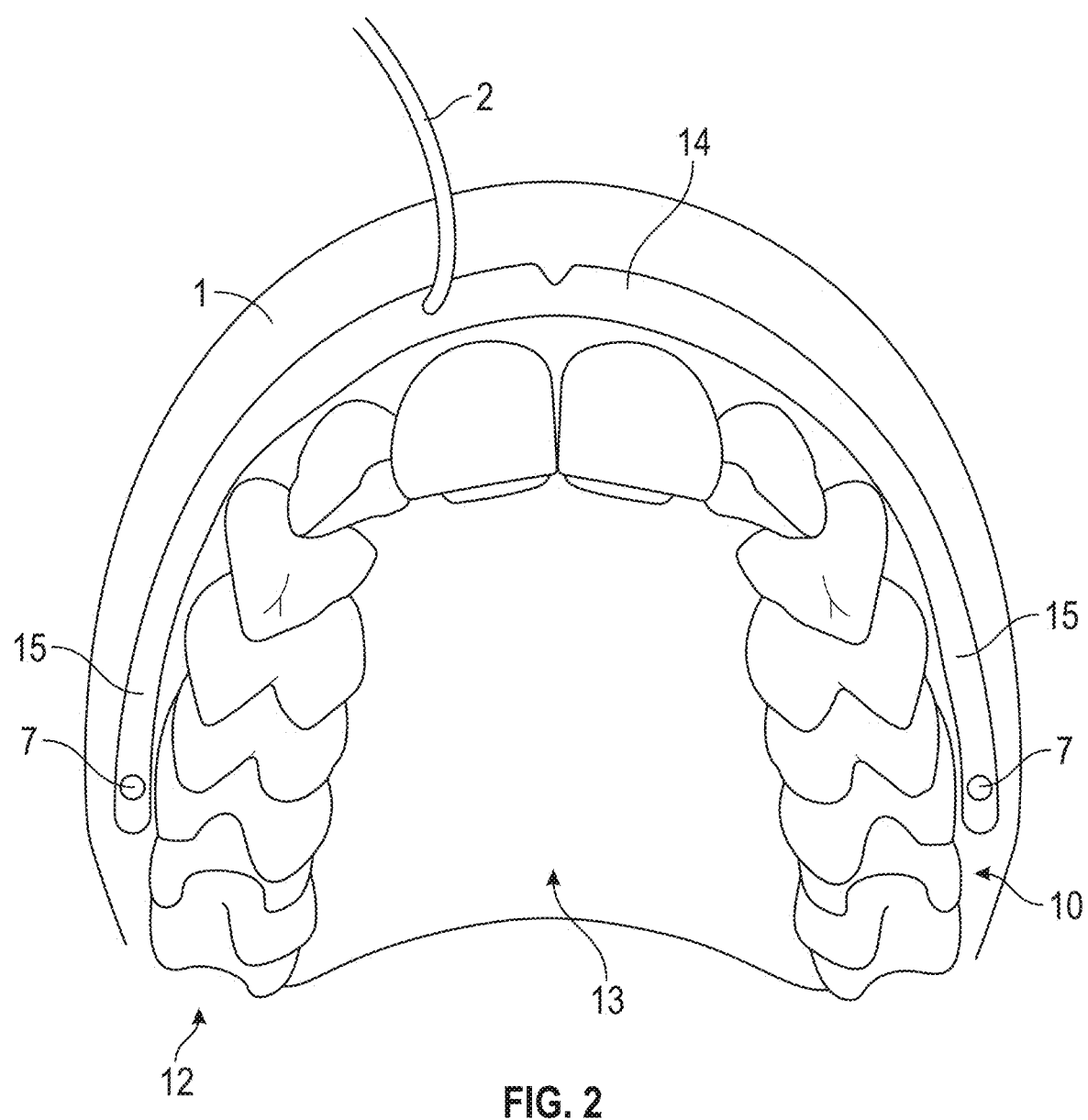
FIG. 2 shows the mouthpiece from FIG. 1 positioned in the superior vestibule of a user, viewed from below.
Figure 3:
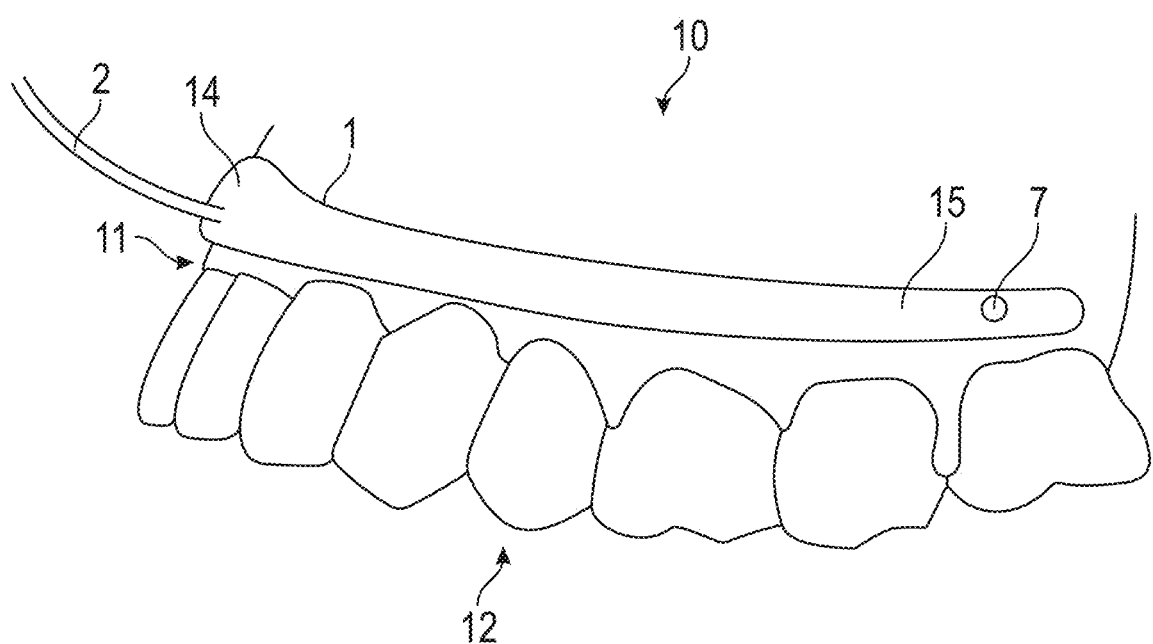
FIG. 3 shows the mouthpiece from FIGS. 1 and 2 positioned in the superior vestibule of a user, viewed from the side.

FIG. 1 shows a mouthpiece 1 according to an embodiment of the invention including an injection tube 2. The injection tube 2 is in use connected to a liquid reservoir or container 3 via a check valve 8 and a second tube 4. The liquid from the container 3 may be injected via a continuously injecting pump (not shown). The mouthpiece 1 comprises an anterior portion 14 and two posteriorly oriented side branches 15 which together form the shape of a C. An inlet 6 is positioned in the anterior portion 14. An outlet 7 is positioned laterally at the posterior end portion of each branch 15. An internal channel 5 (indicated with broken lines) connects the inlet 6 with the outlets 7, and also fluidly connects the outlets 7 to each other. The injection tube 2 is in one end portion connected to the inlet 6 and in an opposite end portion connected to the check valve 8. The internal channel 5 may distribute an injected liquid from the inlet 6 to the two outlets 7 which are positioned complementary to the user's parotid ducts when the mouthpiece 1 is in position of use. The inlet 6 may typically be positioned in the anterior portion 14 of the mouthpiece 1 for easy connection to the injection tube 2 through the mouth opening. The shown mouthpiece 1 may comprise two anterior flaps 9 which are adjusted to fit within the cavities of the superior vestibule 10 (as shown in FIGS. 2 and 3) which are present on each side of the labial frenulum. Between the flaps 9 there is a slit 16 for the labial frenulum to fit within. The flaps 9 and the slit 16 are designed to improve the fit of the mouthpiece 1 to the superior vestibule 10 (not shown in FIG. 1) for improved fixation. The flaps may be relatively minor, e.g. relatively small in relation to the width of the mouthpiece. The thickness, which may be e.g. less than 1.0 mm, 0.8 mm, or 0.6 mm, of the mouthpiece 1 is normal to the plane of the paper in FIG. 1.

FIGS. 2 and 3 show a mouthpiece 1 according to an embodiment of the invention and the position of the mouthpiece 1 relative to the teeth 12 in the superior vestibule 10 of a user, seen from below and from the side, respectively. The mouthpiece is worn higher than the gingival margins.

Figure 4:
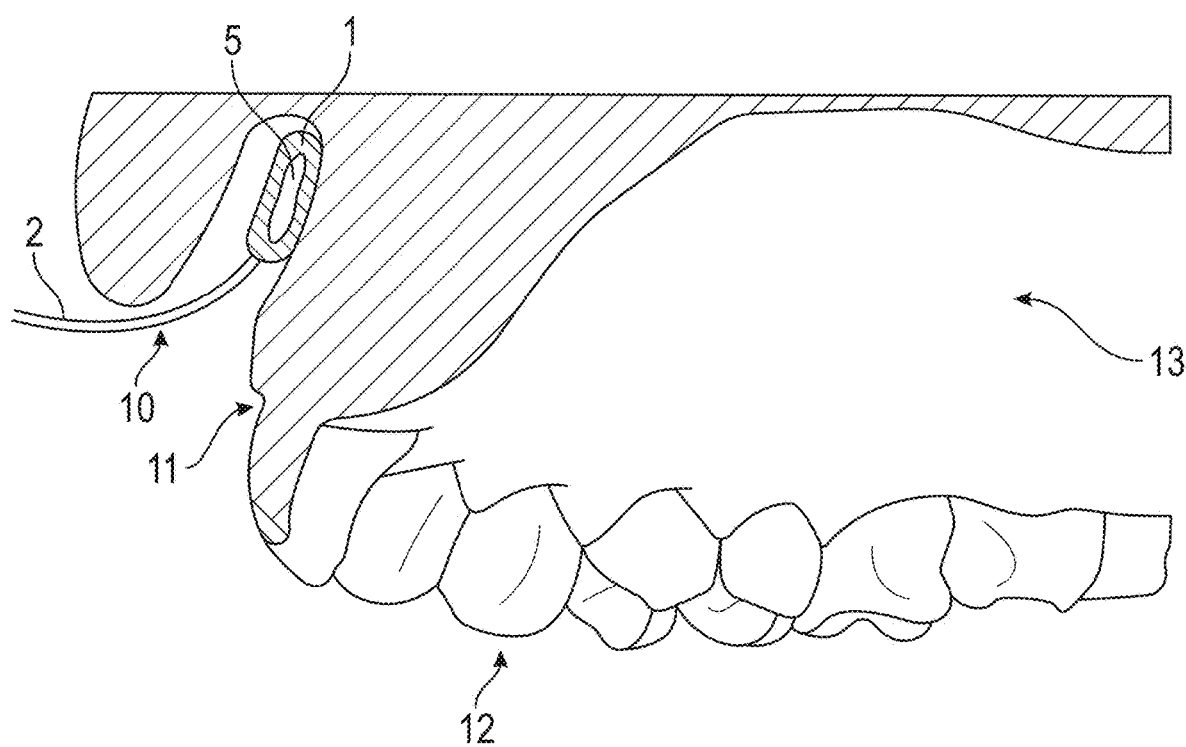
FIG. 4 shows a sectioned view of the mouthpiece from FIGS. 1 to 3 positioned in the superior vestibule of a user, viewed from the side as in FIG. 3.

FIG. 4 shows a sectioned view of the mouthpiece 1 in the superior vestibule 10, cut substantially through the middle of the mouth. The internal channel 5 is visible in the mouthpiece 1. The mouthpiece 1 is thin with a thickness of less than 1.0 mm and relatively wide, resulting in a large surface to volume ratio and a large cross section of the internal channel 5 relative to the thickness. The FIGS. 2-4 demonstrate how the mouthpiece 1 is positioned in the superior vestibule 10 apical to the gingival margin 11. The teeth 12 and the oral cavity proper 13 are thus substantially clear from the mouthpiece 1 so that it is not a problem for the user to eat while wearing said mouthpiece 1. The injection tube 2 is positioned in the front, close to the mouth opening.

The thickness of the mouthpiece 1 is measured along a direction normal to the surface of the gingiva (gums), and the width of the mouthpiece is measured along a direction from the gingival margin 11 to the top of the superior vestibule 10. The width of the mouthpiece 1 is larger than the thickness. FIG. 4 demonstrates how this geometry leads to an internal channel 5 with an elongate cross-section.

Figure 5:
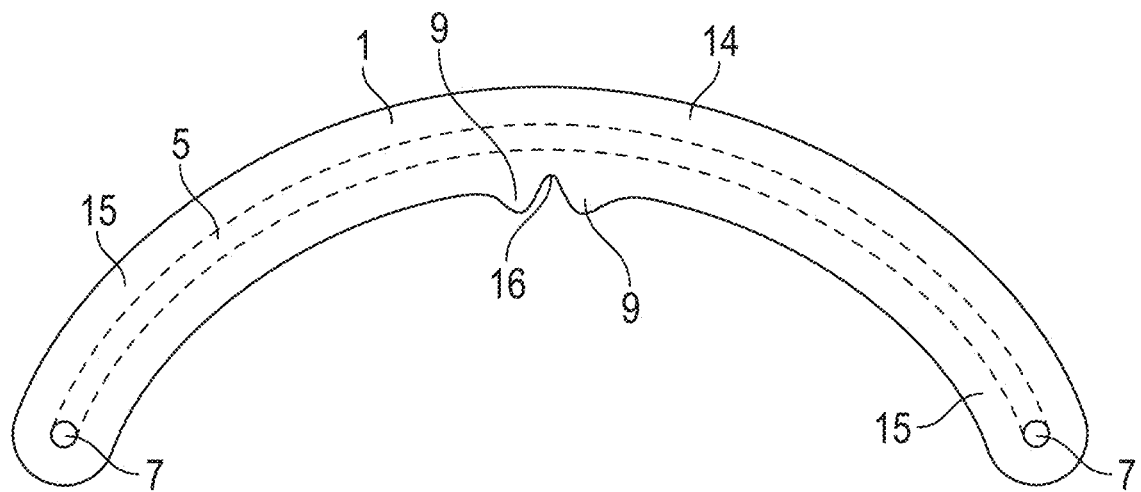
FIG. 5 shows another view of the mouthpiece.

FIG. 5 shows another view of the mouthpiece 1 when not worn by a user. The mouthpiece 1 comprises the slit 16 and the flaps 9. In use, the slit 16 is located at the front and top of the mouthpiece 1 and thereby accommodates the user's labial frenulum. The flaps 9 fit within cavities of the superior vestibule which are present on each side of a labial frenulum. The slit 16 and flaps 9 therefore help to correctly position the mouthpiece 1 in the user's mouth. The mouthpiece 1 may change shape (e.g. by being flexible) when worn by a user.

Figure 6:
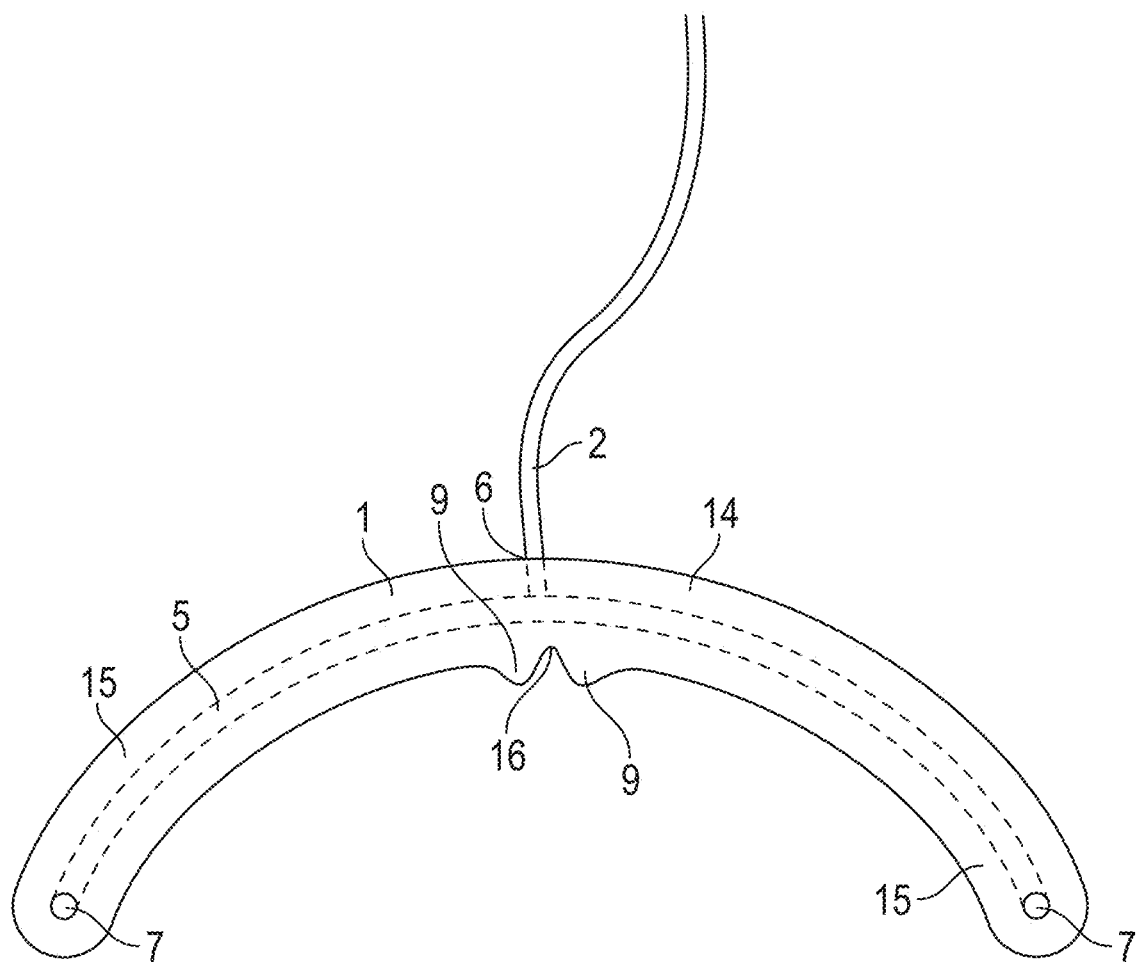
FIG. 6 shows another view of the mouthpiece together with the injection tube.

FIG. 6 shows the mouthpiece 1 and injection tube 2 when not worn by a user. As described with reference to FIG. 5, the slit 16 and flaps 9 are positioned so that they are at the front and top of the mouthpiece 1 when the mouthpiece 1 is worn by a user, and are therefore on an inner curve of the mouthpiece 1 when it is not worn by a user. The slit 16 therefore receives a user's labial frenulum when in use, and flaps extend either side of the labial frenulum. The injection tube 2 is fluidly connected to the single internal channel 5 and extends from the mouthpiece 1 so that in use it extends out of the user's mouth for injection of fluid into the internal channel 5.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. A mouthpiece for distribution of a liquid in a user's mouth, the mouthpiece comprising:
an inlet for a tube;
at least two outlets; and a single internal channel that fluidically connects the at least two outlets to each other and to the inlet, wherein the mouthpiece is configured to be positioned within a superior vestibule of the user's mouth apical to a gingival margin, wherein the mouthpiece is formed of two sheets that are bonded together, apart from in an unfixed region that defines the internal channel, such that a thickness of the mouthpiece is less than 1.0 mm, wherein a width of the mouthpiece is between 0.6 cm and 1.0 cm, and wherein a width of the internal channel is in a range of 1 mm to 3 mm.

2. The mouthpiece according to claim 1, wherein the thickness of the mouthpiece is less than 0.8 mm.

3. The mouthpiece according to claim 1, wherein the mouthpiece comprises an adhesive material configured to promote attachment to a mucous membrane of the user's mouth.

4. The mouthpiece according to claim 3, wherein at least one surface of the mouthpiece is roughened to promote adhesion of the adhesive material.

5. The mouthpiece according to claim 1, further comprising:

a slit configured to receive a labial frenulum of the user, and two flaps adapted to fit within cavities of the superior vestibule which are present on each side of the labial frenulum.

6. A liquid distribution system comprising the mouthpiece according to claim 1, wherein the liquid distribution system additionally comprises a container for containing the liquid to be distributed to the user's mouth, a tube for liquid communication from the container to the mouthpiece, and a mechanism for conducting flow of the liquid from the container to the mouthpiece.

7. The liquid distribution system according to claim 6, wherein the container is configured for containing a liquid comprising dissolved carbon dioxide, so that the carbon dioxide stays dissolved while the liquid is inside the container.

8. An assembly comprising the mouthpiece according to claim 1, further comprising an injection tube fluidly connected to the inlet of the mouthpiece.

9. A method of distributing liquid in a user's mouth, the method comprising:

placing the mouthpiece according to claim 1 within a superior vestibule of the user's mouth apical to a gingival margin, and supplying liquid from a container through at least one tube and into the inlet of the mouthpiece.

10. The assembly according to claim 8, wherein the inlet of the mouthpiece is molded to the injection tube and the injection tube is configured to extend out of the user's mouth.

11. The assembly according to claim 10, wherein the injection tube is configured to be attachable to and detachable from a check valve.

12. The mouthpiece according to claim 1, wherein a cross-sectional width of the internal channel is approximately five times a cross-sectional thickness of the internal channel.

13. The mouthpiece according to claim 1, wherein a cross-sectional width of the internal channel is between 2 and 16 times greater than a cross-sectional thickness of the internal channel.

14. A method of manufacturing the mouthpiece for distribution of a liquid in a user's mouth according to claim 1, the method comprising the steps of:

providing a first half of the mouthpiece as a first sheet;

providing a second half of the mouthpiece as a second sheet, wherein the second half has at least two holes; and fixing the first and second sheets together while keeping a region between the at least two holes unfixed to create the internal channel.

15. The method according to claim 14, wherein the fixing of the first and second sheets together involves using a platinum crosslinking agent followed by vulcanization.

16. A mouthpiece for distribution of a liquid in a user's mouth, the mouthpiece comprising:

an inlet for a tube;

at least two outlets; and a single internal channel that fluidically connects the at least two outlets to each other and to the inlet, wherein the mouthpiece is configured to be positioned within a superior vestibule of the user's mouth apical to a gingival margin, wherein the mouthpiece is formed of two sheets that are bonded together, apart from in an unfixed region that defines the internal channel, such that a thickness of the mouthpiece is less than 1.0 mm, wherein a width of the mouthpiece is between 0.6 cm and 1.0 cm, and wherein a cross-sectional width of the internal channel is between 2 and 16 times greater than a cross-sectional thickness of the internal channel.

17. A method of distributing liquid in a user's mouth, the method comprising:

placing the mouthpiece according to claim 16 within a superior vestibule of the user's mouth apical to a gingival margin, and supplying liquid from a container through at least one tube and into the inlet of the mouthpiece.

18. A mouthpiece for distribution of a liquid in a user's mouth, the mouthpiece comprising:

an inlet for a tube;

at least two outlets; and a single internal channel that fluidically connects the at least two outlets to each other and to the inlet, wherein the mouthpiece is configured to be positioned within a superior vestibule of the user's mouth apical to a gingival margin, wherein the mouthpiece is formed of two sheets that are bonded together, apart from in an unfixed region that defines the internal channel, such that a thickness of the mouthpiece is less than 1.0 mm, wherein a width of the mouthpiece is between 0.6 cm and 1.0 cm, and wherein a cross-sectional width of the internal channel is approximately five times a cross-sectional thickness of the internal channel.

19. A method of distributing liquid in a user's mouth, the method comprising:

placing the mouthpiece according to claim 18 within a superior vestibule of the user's mouth apical to a gingival margin, and supplying liquid from a container through at least one tube and into the inlet of the mouthpiece.

\* \* \* \* \*